US006731490B2

(12) United States Patent
Ikeda et al.

(10) Patent No.: US 6,731,490 B2
(45) Date of Patent: May 4, 2004

(54) SURGE ABSORBER AND PRODUCTION METHOD THEREOF

(75) Inventors: Hiroyuki Ikeda, Chichibu-gun (JP); Takahiro Nakamoto, Chichibu-gun (JP); Masanobu Asami, Chichibu-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/965,855

(22) Filed: Oct. 1, 2001

(65) Prior Publication Data

US 2002/0041477 A1 Apr. 11, 2002

(30) Foreign Application Priority Data

Oct. 2, 2000 (JP) .................................... P2000-302704
Oct. 30, 2000 (JP) .................................... P2000-331509

(51) Int. Cl.[7] ................................................ H02H 1/00

(52) U.S. Cl. ....................... 361/120; 361/128; 361/129; 361/130

(58) Field of Search ................................ 361/120, 121, 361/126, 128, 129, 130; 313/325, 331, 335, 631; 337/28–34

(56) References Cited

U.S. PATENT DOCUMENTS 5,198,791 A * 3/1993 Shibayama et al. ........... 337/31
6,366,439 B1 * 4/2002 Yang .......................... 361/120

FOREIGN PATENT DOCUMENTS

JP 7-320845 12/1995

* cited by examiner

*Primary Examiner*—Michael Sherry
*Assistant Examiner*—Gary L. Laxton
(74) *Attorney, Agent, or Firm*—Oblon, Spivak, McClelland, Maier & Neustadt, P.C.

(57) ABSTRACT

The invention relates to a surge absorber provided with; a surge absorber element composed of a columnar non-conductive member and a conductive film formed dividedly via a discharge gap on a peripheral surface of the non-conductive member, a pair of sealing electrodes disposed at opposite ends of the surge absorber element and touching the conductive film, and a glass tube with opposite ends closed by the sealing electrodes, and the surge absorber element and an inert gas encapsulated thereinside. In the surge absorber of the invention, a face of each sealing electrode which contacts with the surge absorber element is formed in a concave shape symmetrical with a central axis of the glass tube. As a result the surge absorber element can be positioned in the center of the glass tube with high accuracy, the life span and the surge current capacity of the surge absorber can be improved, and low cost and small size becomes possible.

6 Claims, 9 Drawing Sheets

SURGE ABSORBER AND PRODUCTION METHOD THEREOF

BACKGROUND OF THE INVENTION

1. Field of the Invention

The present invention relates to a surge absorber used to protect various devices from surges and to avert accidents beforehand, and to a production method thereof.

2. Description of the Related Art

Surge absorbers are connected to parts that can easily receive electric shocks due to abnormal voltages (surge voltage) from lightning surges and static electricity, such as CRT driving circuits, and the communication lines and connections of electronic devices for use in telecommunication equipment such as telephones, facsimiles, and modems, in order to prevent thermal damage or ignition due to abnormal voltages, of the printed board on which the electrical devices and their equipment are mounted.

Heretofore, a surge absorber using a microgap surge absorber element, such as disclosed for example Japanese Unexamined Patent Application, First Publication No. Hei 7-320845, has been proposed. This surge absorber is one where, in an electric discharge surge absorber where a surge absorber element with a pair of cap electrodes provided on opposite ends of a ceramics member encapsulated by a conductive film and with a so-called microgap formed on a peripheral surface thereof is accommodated inside a glass tube together with an inert gas, as shown in FIG. 11, the opposite ends of a glass tube 1 are sealed by bonding a pair of sealing electrodes 2 by high temperature heating. This surge absorber is a surface mount type (melph type) surge absorber. There are no lead wires in the sealing electrodes 2, and when mounting, this is connected and secured by soldering the sealing electrodes 2 to a substrate.

As illustrated in FIG. 12, this kind of surge absorber is made by inserting one sealing electrode 2, a glass tube 1, a surge absorber element 4, and then the other sealing electrode 2 in this order into a hole portion 10*a* formed in a carbon heater jig 10, and then after replacing the interior with an inert gas, heating the carbon heater jig 10 under a condition with a pressure applied axially, so that the opposite ends of the glass tube 1 are sealed by the pair of sealing electrodes 2.

However, for the above-mentioned conventional surge absorber, the following problems remain. That is, in this surge absorber, when the surge absorber element is inserted into the hole of the carbon heater jig during production, the surge absorber element leans to one side, resulting in a situation where the central axis of the surge absorber element is misaligned to the central axis of the glass tube. When the surge absorber element is sealed in this misaligned condition, the surge absorber element touches the glass tube, so that at the time of discharge, the conductive film disintegrates and is easily adhered to the glass tube, resulting in a situation where the life span of the surge absorber element and the surge current capacity is lowered. In addition, because the electrodes are installed into both ends, the surge absorber element has a high cost. Moreover, the surge absorber is lengthened by an amount of the electrodes.

Furthermore, in this surge absorber, because an easily acquired and inexpensive cylindrical glass tube is used, this rolls easily when mounted on a flat substrate or the like, and cannot be secured in position unless secured with an adhesive or metal fitting. Hence there is a deficiency in work efficiency at the time of mounting.

The present invention take the above problems into consideration, with a first object being to provide a surge absorber and a production method therefor whereby the surge absorber element can be positioned in the center of the glass tube with high accuracy, the life span and the surge current capacity of the surge absorber can be improved, and low cost and small size can be achieved. Moreover, a second aim is to provide a surge absorber with superior installation work efficiency, that does not roll easily.

SUMMARY OF THE INVENTION

A first aspect of the present invention relates to a surge absorber provided with; a surge absorber element composed of a columnar non-conductive member and a conductive film formed dividedly via a discharge gap on a peripheral surface of the nonconductive member, a pair of sealing electrodes disposed at opposite ends of the surge absorber element and touching the conductive film, and a glass tube with opposite ends closed by the pair of sealing electrodes and the surge absorber element and an inert gas encapsulated thereinside, and is characterized in that a face of each sealing electrode which contacts with the surge absorber element is formed in a concave shape symmetrical with a central axis of the glass tube.

A second aspect of the present invention relates to a production method for a surge absorber provided with; a surge absorber element composed of a columnar nonconductive member and a conductive film formed dividedly via a discharge gap on a peripheral surface of the non-conductive member, a pair of sealing electrodes disposed at opposite ends of the surge absorber element and touching the conductive film, and a glass tube with opposite ends closed by the pair of sealing electrodes and the surge absorber element and an inert gas encapsulated thereinside. The production method is characterized in having; an insertion step for inserting one of the pair of sealing electrodes, the glass tube, the surge absorber element, and the other of the pair of sealing electrodes in this order into a hole formed in a production jig of an internal diameter into which the glass tube can be inserted; and a welding step involving replacing an atmosphere gas inside the hole with an inert gas and then welding the sealing electrodes to the glass tube inside the hole by heating the production jig, and a face of each sealing electrodes inserted in the insertion step which contacts with the surge absorber element is formed in a concave shape symmetrical with a central axis of the glass tube which is inserted.

A third aspect of the present invention relates to a surge absorber provided with; a surge absorber element composed of a columnar non-conductive member and a conductive film formed dividedly via a discharge gap on a peripheral surface of the non-conductive member, a pair of sealing electrodes disposed at opposite ends of the surge absorber element and touching the conductive film, and a glass tube with opposite ends closed by the pair of sealing electrodes and the surge absorber element and an inert gas encapsulated thereinside, and is characterized in that a flat portion is formed on at least one portion of an outer peripheral surface of the glass tube.

In this case, preferably at least a pair of the flat surfaces are formed in parallel on opposite sides of the glass tube. Moreover, more preferably a transverse section of the glass tube is a square shape touching an outer periphery of the pair of sealing electrodes.

Furthermore, preferably a ratio of a transverse section area of the surge absorber element to a transverse section area of an inner space of the glass tube is from 1:3 to 1:15.

DESCRIPTION OF THE PREFERRED EMBODIMENTS

First Embodiment

Figure 1:
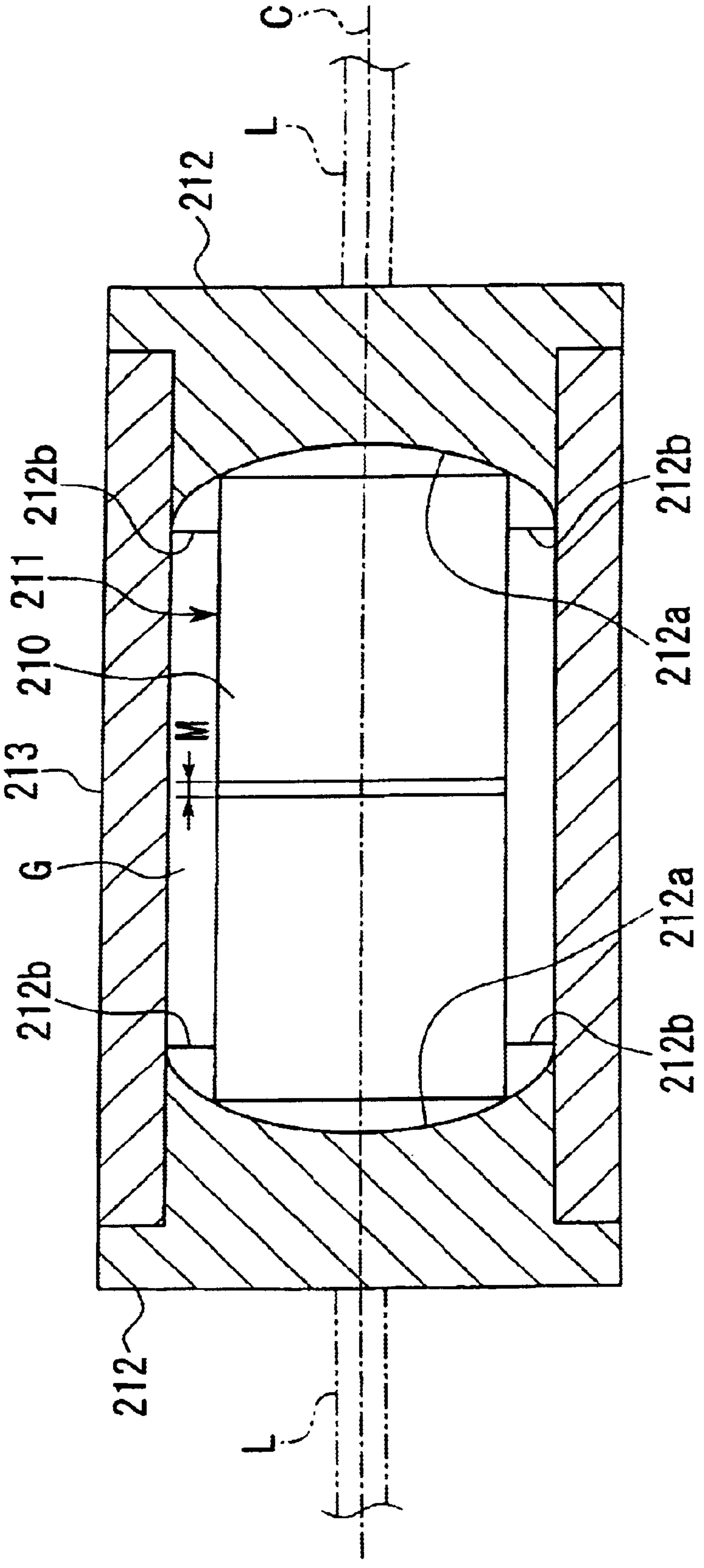
FIG. 1 is a cross-section showing a first embodiment of a surge absorber according to the present invention.

A first embodiment of a surge absorber according to the present invention will be described with reference to FIG. 1.

The surge absorber of the present embodiment is a discharge surge absorber which uses so-called microgaps. This is provided with; a surge absorber element 211 composed of a columnar shaped ceramics member (non-conductive member) wherein a conductive film 210 such as an $SnO_2$ film is dividedly formed via a microgap M (discharge gap) on a peripheral surface, a pair of sealing electrodes 212 forming a column and which touch the conductive film 210, oppositely arranged at both ends of the surge absorber element 211, and a glass tube 213 with opposite ends closed by the sealing electrodes 212, and the surge absorber element 211 and an inert gas G such as He, Ar, Ne, Xe, $SF_6$, $CO_2$, $C_3F_8$, $C_2F_6$, $CF_4$, $H_2$ or a mixture of these gases encapsulated thereinside.

The sealing electrodes 212 are made of Dumet (FeNi alloy), and are welded to the opposite ends of the glass tube 213 by high temperature heating. The surge absorber element 211 is enclosed such that the central axis thereof coincides with the central axis of the glass tube 213 as explained below. In addition, the contact surfaces 212*a* of the sealing electrodes 212 which contact with surge absorber element 211 are formed in a concave shape symmetrical with a central axis C of the glass tube 213. That is, the glass tube 213 and the pair of sealing electrodes 212 are secured with the center of the contact surfaces 212*a* and the central axis C of the glass tube 213 coinciding.

Regarding the microgap M, the conductive film 210 is formed on the surface of the ceramics member of a mullite sintered body or the like by a film forming technique such as; a sputtering method, an evaporation method, an ion-plating method, a plating method or a CVD method. The conductive film 210 is then irradiated and removed with a laser light to divide the conductive film 210 and form the microgap M to a width of approximately 10 to 200 $\mu$m.

In this surge absorber, one of the sealing electrodes 212 and one of the conductive films 210 are connected electrically, and the other sealing electrode 212 and the other conductive film 210 are connected electrically. Furthermore, the one conductive film 210 and the other conductive film 210 are electrically insulated by the microgap M. Therefore, when an intermittent excess voltage or excess current penetrates the surge absorber, it is estimated that the opposite conductive films 210 in the microgap M suffer thermal damage and the width of the micro gap M is widened. As a result the discharge maintenance voltage is increased and the discharge stops.

Moreover, in the surge absorber of the present embodiment, since the electric field is concentrated at the circumference portion 212*b* of the contact surface 212*a* of the sealing electrodes 212, performing the role of the conventional cap electrodes, this has a similar discharge effect even without cap electrodes, and discharge is possible at the circumference portion 212*b*. Furthermore in this situation, because the circumference portion 212*b* where the discharge is performed is far from the outer periphery of the surge absorber element 211, it is possible to extend the discharge space more than when using a cap electrode, so that it is possible to improve the lifespan and the surge current capacity of the surge absorber. Moreover, because the cap electrode is unnecessary, it is possible to devise a surge absorber that is smaller and less expensive than a surge absorber that uses cap electrodes.

Figure 2:
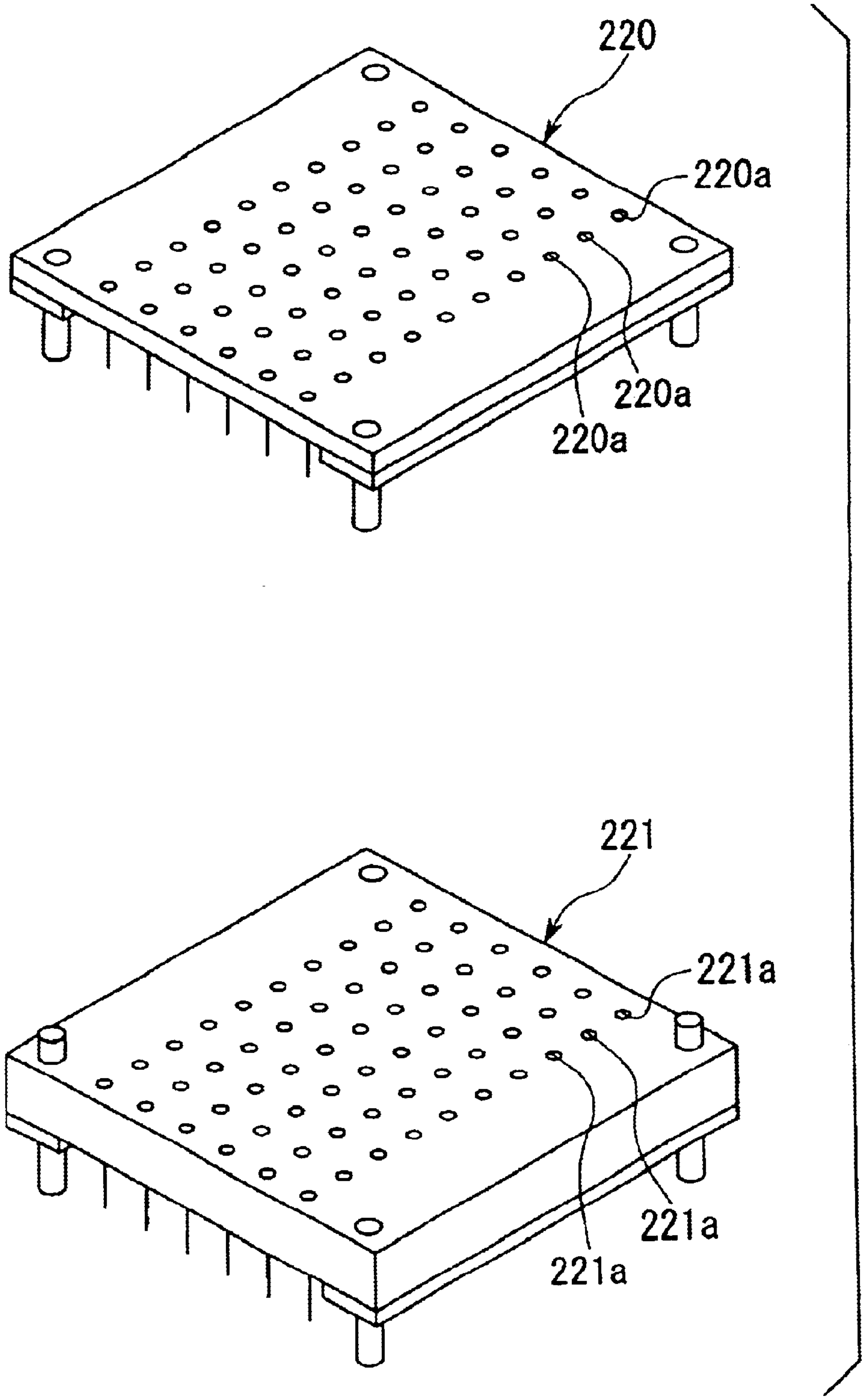
FIG. 2 is a perspective diagram showing an upper and lower carbon heater jig in a first embodiment of a production method for a surge absorber according to the present invention.
Figure 6:
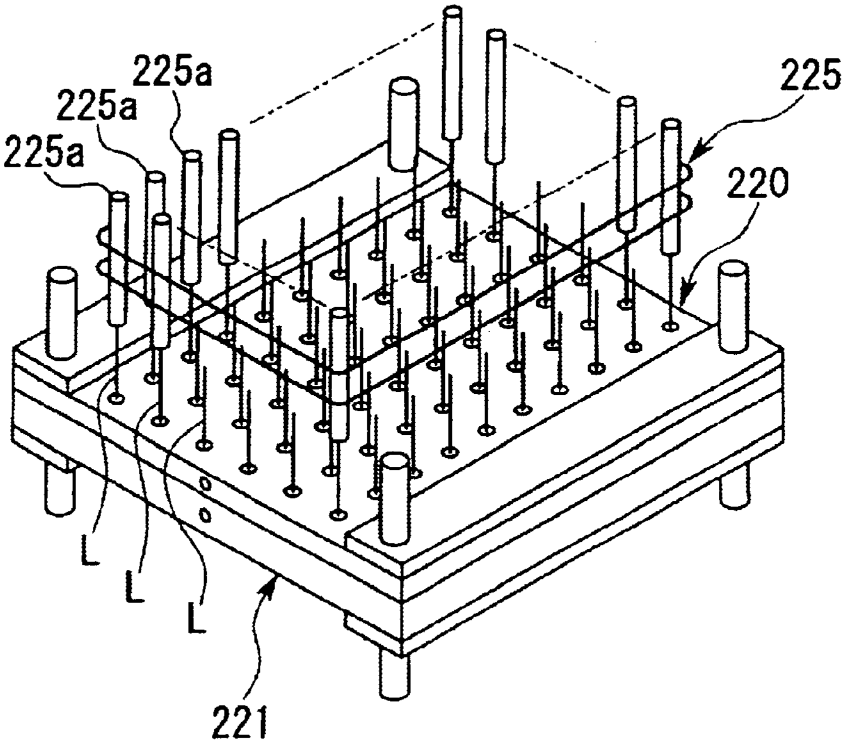
FIG. 6 is a perspective diagram showing a condition wherein a weight jig is set on the superposed upper carbon heater jig and lower carbon heater jig, in the first embodiment of the production method for a surge absorber according to the present invention.

Next is a description of a production method for the surge absorber of the present embodiment with reference to FIG. 2 through to FIG. 6.

The above-mentioned surge absorber has been described using a melph type. However, this production method is described using a lead wire type wherein lead wires L are provided beforehand in the sealing electrodes 212.

At first, as shown in FIG. 2, the one sealing electrodes 212 fitted with lead wires L are inserted into a plurality of hole portions 220*a* provided in the upper carbon heater jig (production jig) 220. At this time, these are inserted with the lead wire L directed downwards.

Figure 3A:
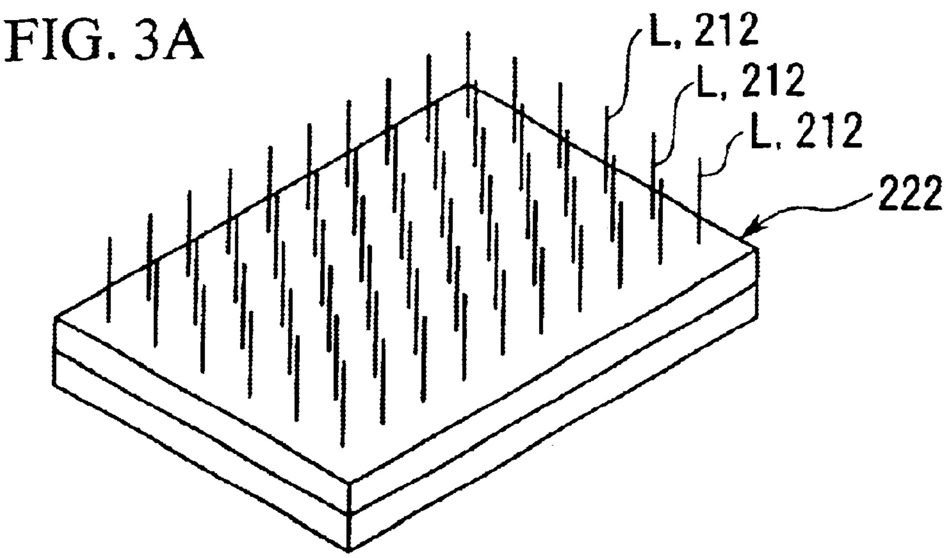
FIG. 3A is a perspective diagram showing a jig for inserting lead wires in the first embodiment of the production method for a surge absorber according to the present invention.
Figure 3B:
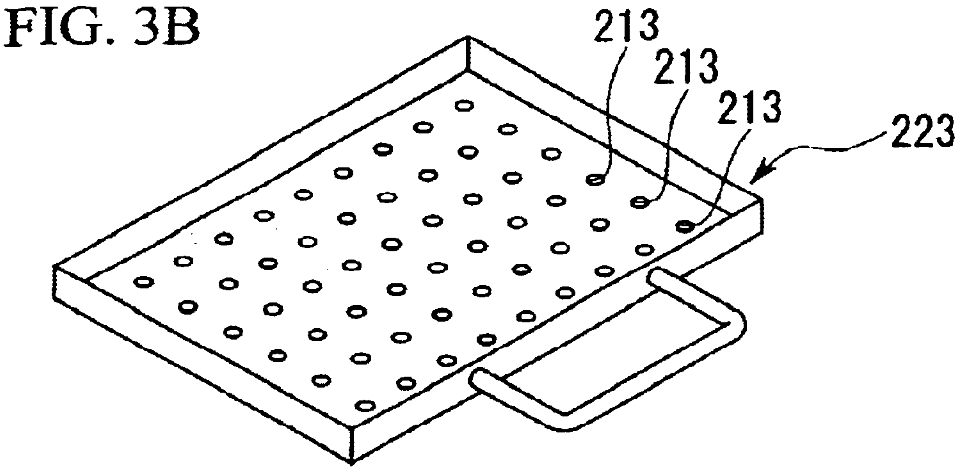
FIG. 3B is a perspective diagram showing a jig for inserting glass tubes in the first embodiment of the production method for a surge absorber according to the present invention.
Figure 3C:
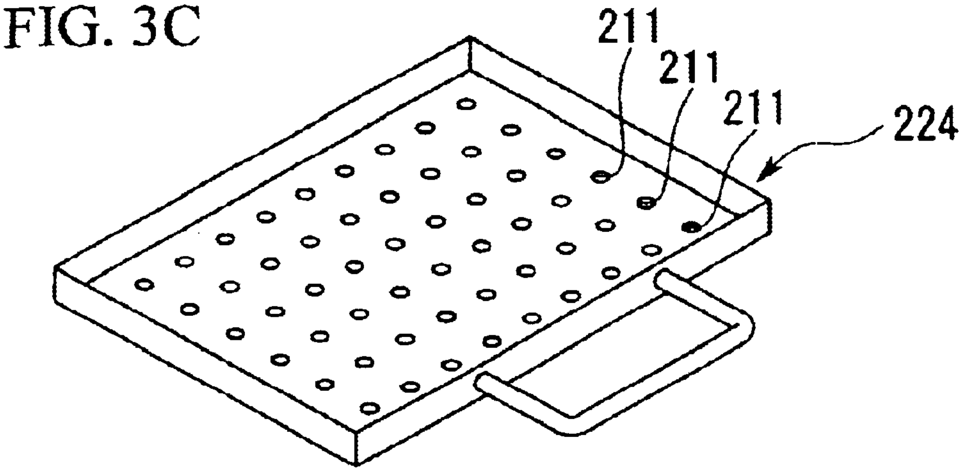
FIG. 3C is a perspective diagram showing a jig for inserting surge absorber elements in the first embodiment of the production method for a surge absorber according to the present invention.

On the other hand, as shown in FIG. 3A to FIG. 3C, the other sealing electrodes 212 fitted with lead wires L, the glass tubes 213 and the surge absorber elements 211 are inserted in this order into the plurality of hole portions 221*a* provided in the lower carbon heater jig 221 using the jigs 222, 223 and 224 respectively. At this time also, the sealing electrodes 212 are inserted with the lead wires L directed downwards.

Figure 4:
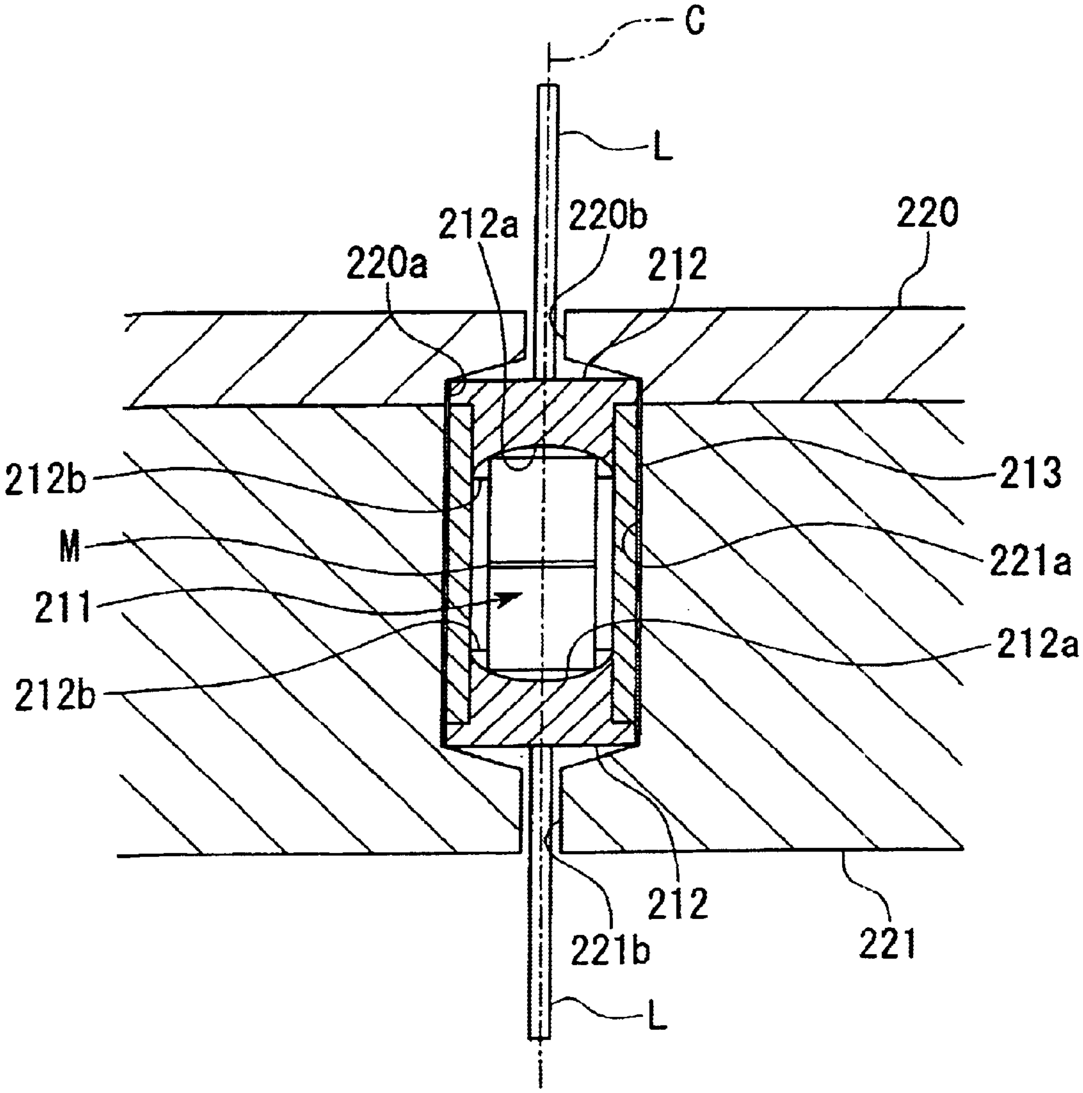
FIG. 4 is a cross-section showing a condition of each portion inserted inside holes in the first embodiment of the production method for a surge absorber according to the present invention.

As shown in FIG. 4, in the hole portions 220*a* and 221*a* of the upper and lower carbon heater jigs 220 and 221 small diameter portions 220*b* and 221*b* through which only the lead wires L can pass are respectively formed in the lower portions, and when the sealing electrodes 212 are inserted, the lead wires L are in condition protruding from the lower surfaces of the jigs 220 and 221.

In addition, the internal diameter of the opening portion of the hole portion 221*a* of the lower carbon heater jig 221 is set at a size at which the glass tube 213 can be just inserted.

Here, as mentioned above, the contact surface 212*a* of the sealing electrode 212 is formed in a concave shape symmetrical with a central axis C of the glass tube 213. Therefore, as shown in FIG. 4, at the time of insertion the surge absorber element 211 does not lean to one side. As a result the central axis of the surge absorber element 211 can be made to coincide with the central axis C of the glass tube 213 easily and with high accuracy.

Figure 5:
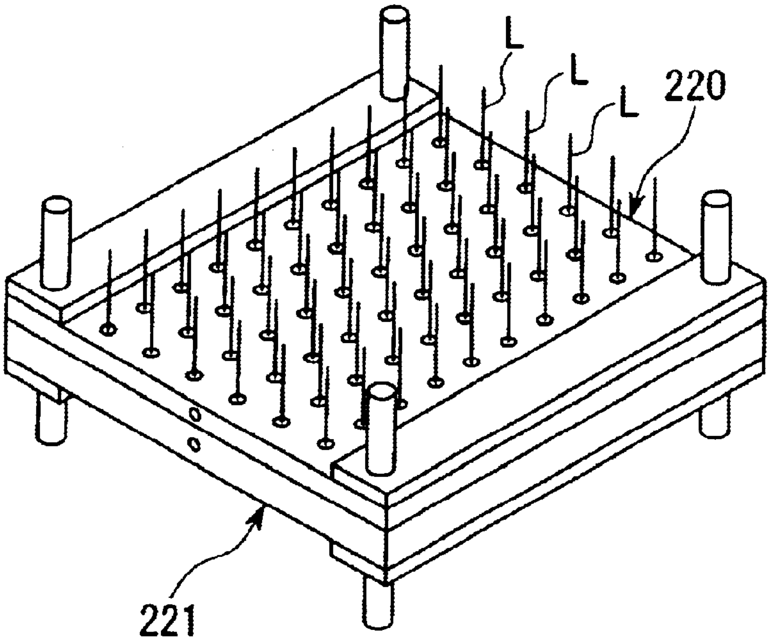
FIG. 5 is a perspective diagram showing a condition wherein the upper carbon heater jig and the lower carbon heater jig are superposed, in the first embodiment of the production method for a surge absorber according to the present invention.

Subsequently, as mentioned above, the upper faces of the upper carbon heater jig 220 and the lower carbon heater jig 221 are superposed on each other as shown in FIG. 5 so that the mutual hole portions 220*a* and 221*a* thereof with the respective members inserted thereinside coincide. At this time as shown in FIG. 4, the other sealing electrodes 212 are fitted into the upper opening portions of the glass tubes 213.

In this situation, as shown in FIG. 6, the weight jig 225 is set on the upper carbon heater jig 220. This weight jig 225 is set so as to mount columnar weight members 225*a* on the upper ends of the lead wires L protruding from the upper portion, so as to apply a fixed load to the lead wires L.

In the situation with the weight jig 225 set, the upper and lower carbon heater jigs 220 and 221 are set inside an enclosing machine (omitted from the figures), the atmosphere gas inside is replaced with a predetermined inert gas G, and then the opposite ends of the glass tube 213 and the pair of sealing electrodes 212 are welded by heating the upper and lower carbon heater jigs 220 and 221, and the surge absorber element 211 and the inert gas G are encapsulated thereinside.

After the encapsulation has been completed in this way, the weight jig 225, and the upper and lower carbon heater jigs 220 and 221 are removed, and the completed surge absorbers taken out from the lower carbon heater jig 221, thus completing the production.

In the production method for the surge absorber of the present embodiment, the contact surfaces 212*a* of the sealing electrodes 212 are formed in a concave shape symmetrical with a central axis C of the glass tube 213. Therefore, when the surge absorber elements 211 are inserted, the central axis of the surge absorber element 211 can be made to coincide with the central axis C of the glass tube 213 with high accuracy. As a result, the surge absorber element 211 is positioned accurately, enabling a surge absorber with a long lifespan and a high surge current capacity to be obtained.

The technical scope of the present invention is not limited to the above embodiments, and various modifications can be added within a scope which does not depart from the gist of the invention.

For example, in the above-mentioned embodiment, the shape of the contact surface 212*a* of the sealing electrodes 212 is a cross-sectional U shaped concave surface, but this may also be other concave shapes. For example, the contact surface may be a cross-sectional V shaped concave surface symmetrical with the central axis of the glass tube in which the sealing electrodes are inserted. Moreover, the bottom of the concave surface may be a flat surface.

Figure 7:
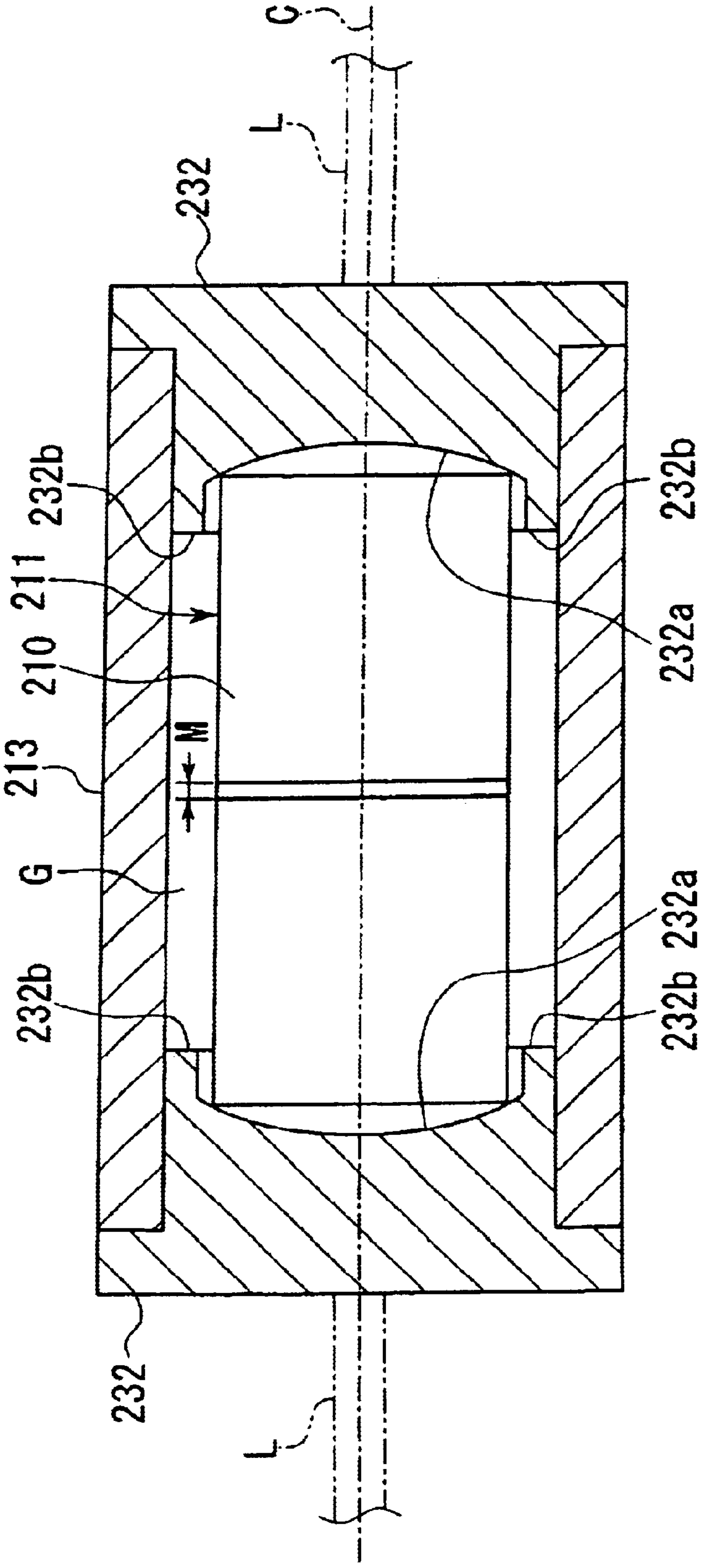
FIG. 7 is a cross-section showing a modified example of the first embodiment of the surge absorber according to the present invention.

In addition, in the above-mentioned embodiment, the circumference portion 212*b* of the sealing electrodes 212 is in the form of an angle point, but in another embodiment as shown in FIG. 7, a circumference portion 232*b* of the sealing electrodes 232 may also be in a flat shape (or with rounded corners). Furthermore, as in the example shown in FIG. 7, a circumference portion 232*b* of rectangular shape in cross-section may be protruded with a step formed between the contact surface 232*a* of the sealing electrodes 232 and the circumference portion 232*b*. Needless to say, the above-mentioned surge absorber and the production method therefor may be applied to both a surge absorber of a melph type with no lead wires and a surge absorber of a type having lead wires.

Second Embodiment

Figure 8:
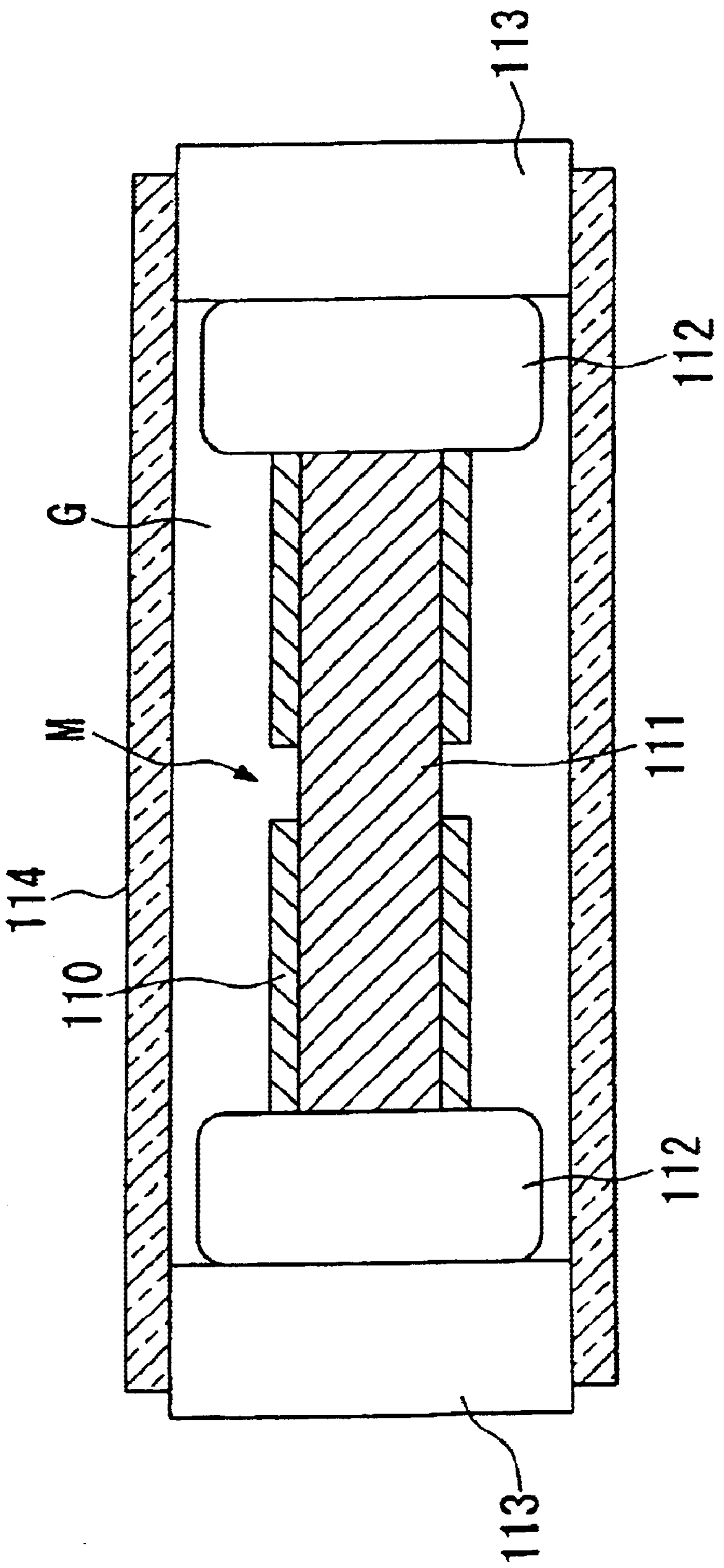
FIG. 8 is a cross-section showing a second embodiment of a surge absorber according to the present invention.
Figure 10:
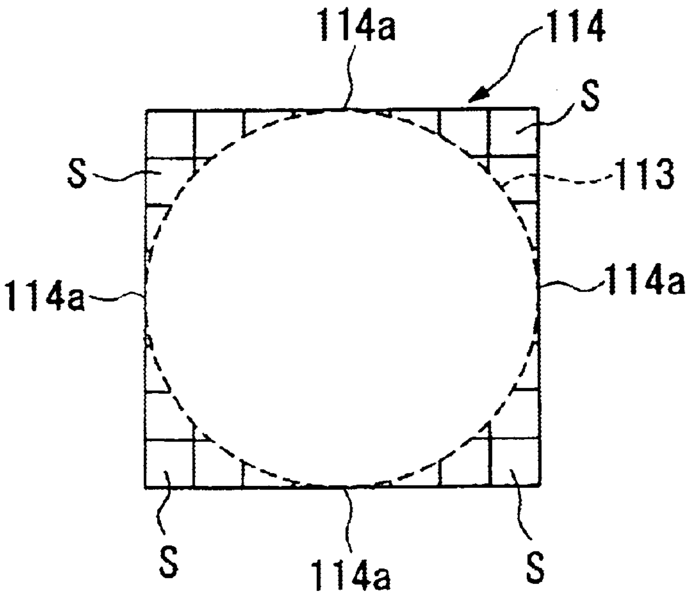
FIG. 10 is an explanatory drawing shown in cross-section for explaining a discharge space in the surge absorber shown in FIG. 8.
Figure 11:
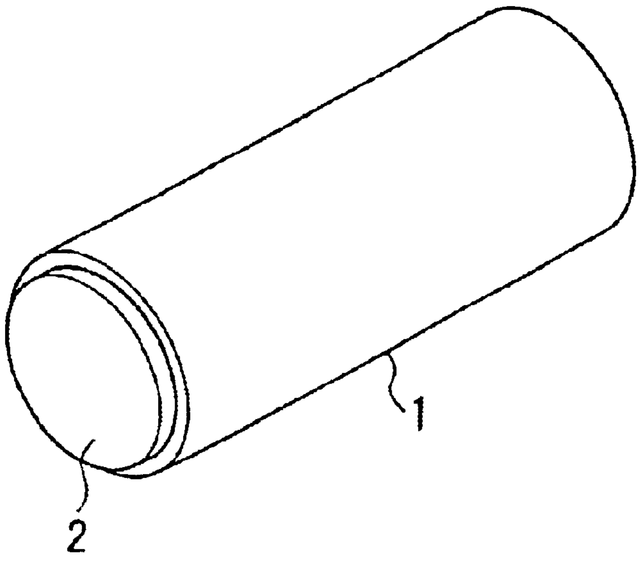
FIG. 11 PRIOR ART
FIG. 11 is a perspective diagram showing an example of a conventional surge absorber.
Figure 12:
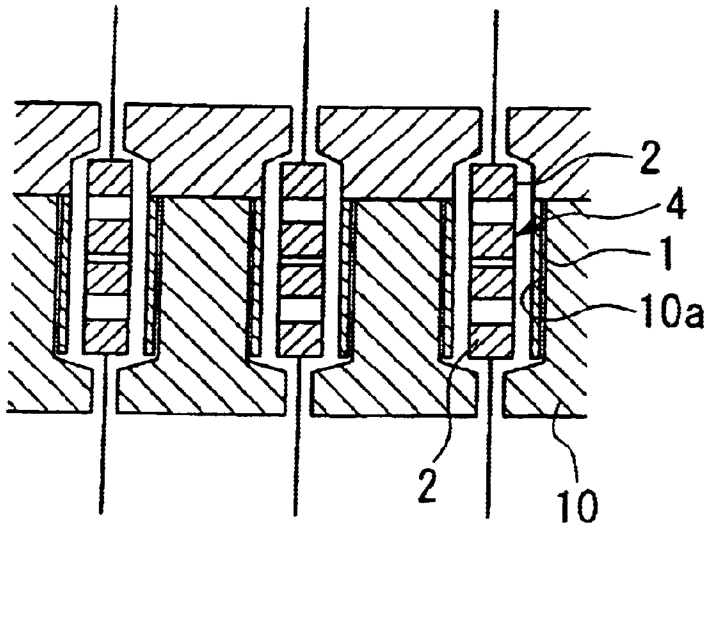
FIG. 12 PRIOR ART
FIG. 12 is a cross-section showing an example of a condition of each portion inserted into a hole portion, in the conventional surge absorber and the production method thereof.

Hereunder is a description of a second embodiment of a surge absorber according to the present invention with reference to FIG. 8 through to FIG. 10. The surge absorber of the present embodiment is similar to the above-mentioned first embodiment, being a so-called discharge type surge absorber that uses microgaps. As shown in FIG. 8, this is provided with; a surge absorber element 111 composed of a columnar ceramics member (non-conductive member) wherein a conductive film 110 formed dividedly via a microgap M on a peripheral surface; a pair of cap electrodes 112 disposed facing opposite ends of the surge absorber element 111 and touching the conductive film 110, a pair of sealing electrodes 113 formed in a column disposed on the outer side of the cap electrodes 112, and a glass tube 114 with opposite ends closed by the sealing electrodes 113, and the surge absorber element 111 and an inert gas G encapsulated thereinside. In addition, the surge absorber element 111 is encapsulated so that the central axis thereof coincides with the central axis of the glass tube 114.

Figure 9:
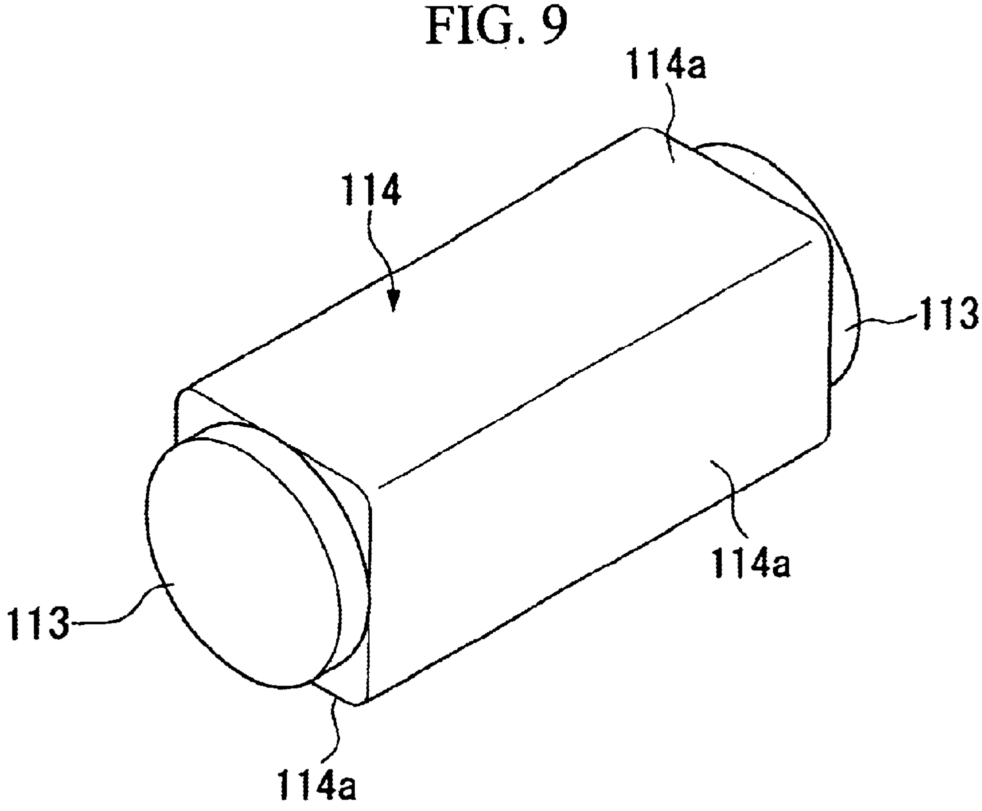
FIG. 9 is a perspective diagram of the surge absorber shown in FIG. 8.

The glass tube 114 is formed from lead glass or the like, and as shown in FIG. 9, the transverse section shape is made in a quadrangle shape (square) touching the outer periphery of the pair of sealing electrodes. As a result, it has four flat portions 114*a* on the outer peripheral surface. In addition, the ratio of a transverse section area of the surge absorber element 111 to a transverse section area of the inner space of the glass tube 114 is set at from 1:3 to 1:15, and in the present embodiment is set at 1:14.

The materials for the conductive film 110, the sealing electrodes 113, the inert gas G and the glass tube 114, and the method of forming the microgap M, and moreover, the discharge prevention mechanism of the surge absorber are all the same as for the above-mentioned embodiments.

In the surge absorber of this embodiment, because the flat portions 114*a* are formed on the outer peripheral surface of the glass tube 114, then by positioning on a flat board such as a print board with the flat portion 114*a* downwards, the surge absorber is difficult to roll, enabling installation work efficiency of the surge absorber to be improved.

In addition, because the flat portions 114*a* on opposite sides of the glass tube 114 are made parallel, there is also a flat portion 114*a* on the side (upper side) opposite to the flat portion 114*a* of the side that is placed on top of the flat board. Therefore, by performing vacuum aspiration for the flat portion 114*a* the surge absorber can be easily held, facilitating automation of mounting.

Moreover, the transverse section shape of the glass tube 114 is a quadrangle shape (that is, an overall square shape)

which touches the outer periphery of the sealing electrodes 113. Therefore, between the surge absorber element 111 and the glass tube 114, that is on inside of the corner of the glass tube 114, a wide discharge space S results (the region shown by the grid lines in FIG. 10 is the increment of the discharge space S). Because of this, the life span and the surge current capacity of the surge absorber is increased.

Furthermore, the ratio of the transverse section area of the surge absorber element 111 to the transverse section area of the inner space of the glass tube 114 is 1:14. However, this ratio is for a necessary and sufficient glass tube size to ensure the most effective surge life-span and surge current capacity for the size (transverse section area) of the surge absorber element 111.

Incidentally, in contrast to types that use conventional cylindrical glass tubes, the surge absorber of the present embodiment improves the lifespan by 50% in the case where for example a 100A current is applied by an 8/20 $\mu$s surge current wave. In addition, in the case where the current is applied by an 8/20 $\mu$s surge current wave, the surge current capacity is improved 100%.

The technical scope of the present invention is not limited to the above embodiments, and various modifications can be added within a scope which does not depart from the scope of the invention.

For example, in the above-mentioned embodiment, the transverse section shape of the glass tube 114 is a square shape, but provided there is a flat portion 114*a* on at least one part of the outer peripheral surface, other transverse section shapes may be used. For example, the transverse section of the glass tube may also be in the form of a triangle. However, if the opposite flat portions 114*a* are made parallel, then as mentioned above, vacuum attraction can be easily implemented, facilitating automation of mounting. Hence it is preferable to make the shape of the transverse section of the glass tube a quadrangle shape.

Moreover, in the above embodiment, the present invention was applied to a melph type surge absorber, but this may also be applied to surge absorbers with lead wires attached to the sealing electrode. It is of course also possible to make a transverse section shape of the glass tube 213 in the first embodiment the same as the transverse section shape of the glass tube 114 in the second example.

In addition, in each of the above embodiments, a mullite sintered body was used for the ceramics member, but a non-conductive ceramics such as alumina, beryllia, stellite, forsterite, zircon, ordinary porcelain, glass ceramics, silicon nitride, aluminum nitride or silicon carbide may be used.

What is claimed is:

1. A surge absorber provided with; a surge absorber element composed of a columnar non-conductive member and a conductive film formed dividedly via a discharge gap on a peripheral surface of said non-conductive member, a pair of sealing electrodes disposed at opposite ends of said surge absorber element and touching said conductive film, and a glass tube with opposite ends closed by said sealing electrodes, and said surge absorber element and an inert gas encapsulated thereinside, wherein a face of each sealing electrode which contacts with said surge absorber element is formed in a concave shape symmetrical with a central axis of said glass tube.

2. A surge absorber according to claim 1, wherein a flat portion is formed on at least one portion of an outer peripheral surface of said glass tube.

3. A surge absorber according to claim 2, wherein at least a pair of said flat surfaces are formed in parallel on opposite sides of said glass tube.

4. A surge absorber according to claim 3, wherein a transverse section of said glass tube is a square shape touching an outer periphery of said pair of electrodes.

5. A surge absorber according to any one of claim 1 through claim 4, wherein a ratio of a transverse section area of said surge absorber element to a transverse section area of an inner space of said glass tube is from 1:3 to 1:15.

6. A production method for a surge absorber provided with; a surge absorber element composed of a columnar non-conductive member and a conductive film formed dividedly via a discharge gap on a peripheral surface of said non-conductive member, a pair of sealing electrodes disposed at opposite ends of said surge absorber element and touching said conductive film, and a glass tube with opposite ends closed by said sealing electrodes, and said surge absorber element and an inert gas encapsulated thereinside, said method having;

an insertion step for inserting one of said pair of sealing electrodes, said glass tube, said surge absorber element, and the other of said pair of sealing electrodes in this order into a hole formed in a production jig of an internal diameter into which said glass tube can be inserted; and a welding step involving replacing an atmosphere gas inside said hole with an inert gas and then welding said sealing electrodes to said glass tube inside said hole by heating said production jig, and a face of each sealing electrode inserted in said insertion step which contacts with said surge absorber element is formed in a concave shape symmetrical with a central axis of said glass tube which is inserted.

* * * * *